(12) United States Patent
Grindstaff et al.

(10) Patent No.: US 6,564,960 B1
(45) Date of Patent: May 20, 2003

(54) COLLAPSIBLE ARTICLE

(76) Inventors: M. Boyd Grindstaff, 718 S. Main, Grove, OK (US) 74344; Debbie S. Grindstaff, 718 S. Main, Grove, OK (US) 74344

( * ) Notice: Subject to any disclaimer, the term of this patent is extended or adjusted under 35 U.S.C. 154(b) by 0 days.

(21) Appl. No.: 09/493,302

(22) Filed: Jan. 28, 2000

(51) Int. Cl.$^7$ ................................................. B65D 6/00
(52) U.S. Cl. .................. 220/4.31; 220/4.16; 217/12 R; 217/51; 217/88
(58) Field of Search ....................... 220/4.31, 4.08, 220/4.16, 4.28, 6, 666, DIG. 1; 217/88, 96, 12 R, 43 R, 51, 92

(56) References Cited

U.S. PATENT DOCUMENTS

| | | | |
|---|---|---|---|
| 55,137 A | 5/1866 | Merrill | |
| 115,088 A | 5/1871 | Niles | |
| 512,783 A | * 1/1894 | Williams | 217/51 |
| 667,953 A | 2/1901 | Ross | |
| 817,241 A | 4/1906 | Green | |
| 906,231 A | * 12/1908 | Hubbard | 217/12 R |
| 961,161 A | * 6/1910 | Prahl | 217/51 |
| 965,982 A | 8/1910 | Beal et al. | |
| 1,032,675 A | 7/1912 | Holland | |
| 1,052,178 A | * 2/1913 | Robinson | 217/51 |
| 2,260,652 A | * 10/1941 | Ashley | 217/88 |
| 2,344,861 A | * 3/1944 | Fowler | 217/12 R |
| 2,861,277 A | * 11/1958 | Hermann | 220/4.16 X |
| 3,462,038 A | * 8/1969 | Morris | 217/88 X |
| 4,227,621 A | 10/1980 | Jones et al. | 217/96 |
| 4,640,437 A | 2/1987 | Weingartner | 220/400 |

* cited by examiner

*Primary Examiner*—Steven Pollard
(74) *Attorney, Agent, or Firm*—William R. Sharp

(57) ABSTRACT

A collapsible article is disclosed herein which comprises: a plurality of slats, each slat having opposing longitudinally extending edges, a flute extending along one edge, a bead extending along the other edge and adapted to fit within the flute of an adjacent slat, and at least one opening transversely extending between the bead and flute; and at least one elongated elastic member received in and extending through said at least one opening of each slat so that the slats are selectively positionable between (i) an expanded, hollow form having opposing open ends, and (ii) a collapsed, substantially flat form. The collapsible article preferably further comprises a support member engageable with the slats in their expanded form and removable from the slats to allow collapse thereof.

13 Claims, 2 Drawing Sheets

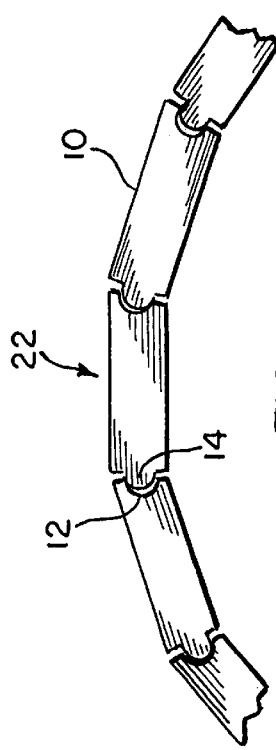
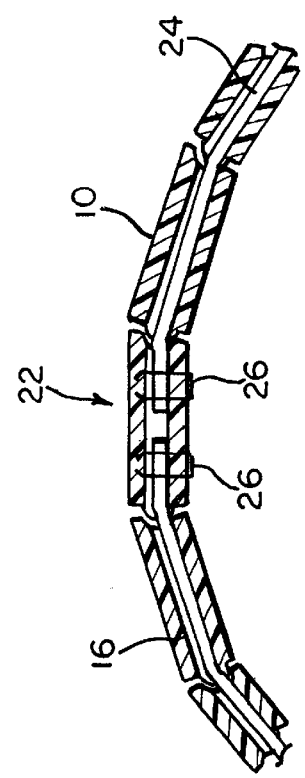
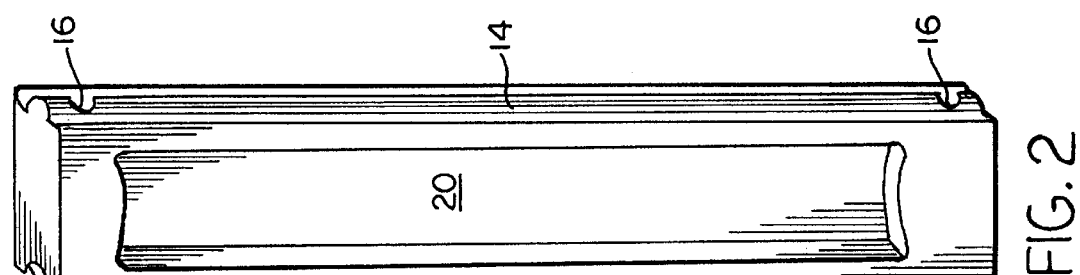
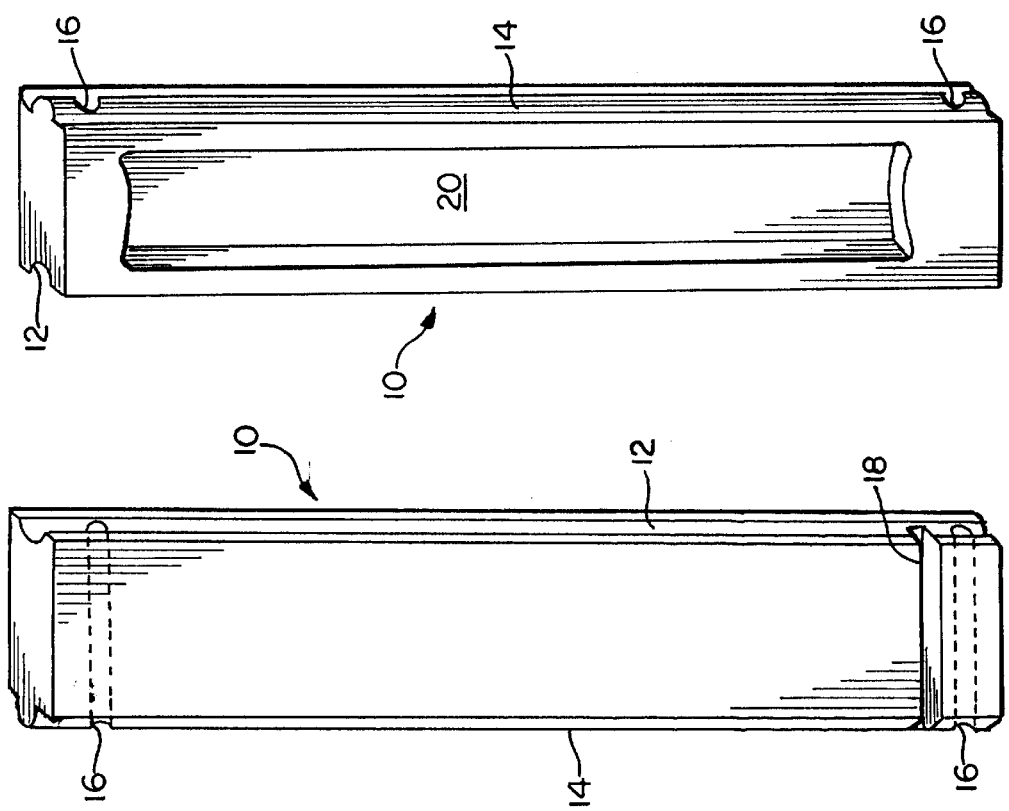

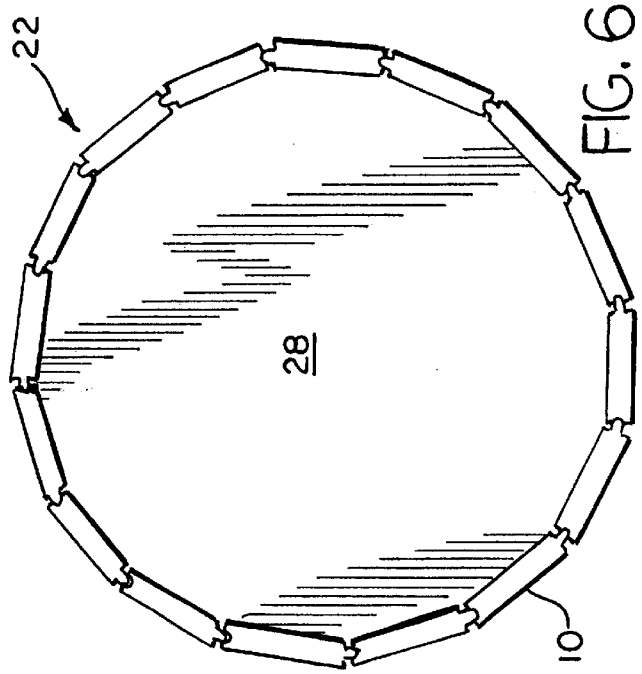
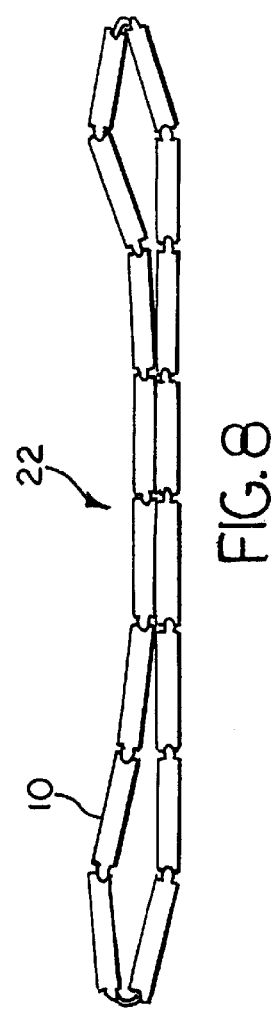
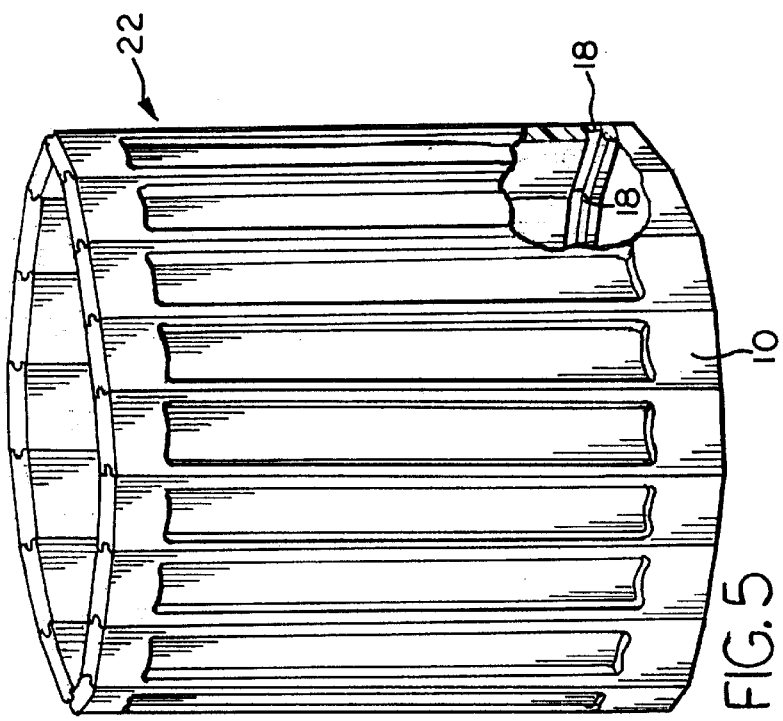
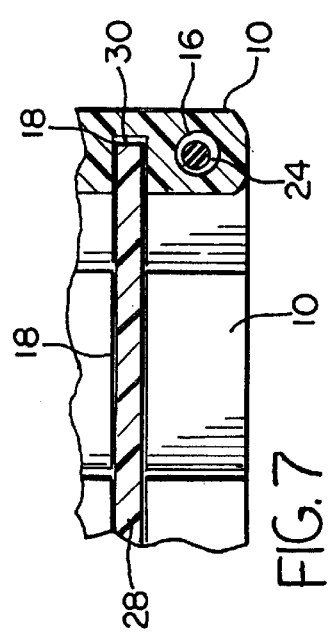

COLLAPSIBLE ARTICLE

BACKGROUND OF THE INVENTION

The invention relates to an article that can be collapsed from an expanded, hollow form in which the article can be used as, for example, a plant container.

Plant containers are typically used only during certain seasons, and then stored when not in use. A number of such containers can occupy considerable storage space. Moreover, shipping of plant containers in bulk by a distributor or manufacturer can be expensive because of space requirements.

SUMMARY OF THE INVENTION

It is, therefore, an object of the invention to provide an article, adaptable for use as a plant container, which is collapsible to minimize space requirements for storage and/or shipping.

The above object is realized by a collapsible article comprising: a plurality of slats, each slat having opposing longitudinally extending edges, a substantially rounded groove (hereafter referred to as a "flute") extending along one edge, a substantially rounded projection (hereafter referred to as a "bead") extending along the other edge and adapted to fit within the flute of an adjacent slat, and at least one opening transversely extending between the bead and flute; and at least one elongated elastic member received in and extending through said at least one opening of each slat so that the slats are selectively positionable between (i) an expanded, hollow form having opposing open ends, and (ii) a collapsed, substantially flat form. The collapsible article preferably further comprises a support member engageable with the slats in their expanded form and removable from the slats to allow collapse thereof. A single support member positioned adjacent to one end of the slats as in their expanded form makes the article useable as a container, in which the support member functions as the bottom when oriented appropriately for use in containing plants or other items.

BRIEF DESCRIPTION OF THE DRAWINGS

FIG. 1 is a perspective view of a single slat, showing the inner side thereof.

FIG. 2 is a perspective view of the slat of FIG. 1 as oriented to show its outer side.

FIG. 3 is a fragmentary top view of a collapsible article comprising a plurality of slats in their expanded form.

FIG. 4 is transverse cross-sectional view of that portion of the collapsible article shown in FIG. 3.

FIG. 5 is a perspective view of the collapsible article shown fragmentarily in FIGS. 3 and 4, wherein a portion is broken away to show internal details.

FIG. 6 is a top view of the collapsible article as further comprising a support member engaged with the slats in their expanded form.

FIG. 7 is a longitudinal cross-sectional view of a portion of the collapsible article having the support member engaged with the slats.

FIG. 8 is an end view of the collapsible article with the support member removed and in its collapsed form.

DETAILED DESCRIPTION OF THE DRAWINGS

Referring to FIG. 1, the illustrated slat 10 has opposing longitudinally extending edges, a flute 12 extending along one edge, a bead 14 extending along the other edge, and a pair of longitudinally spaced openings 16 which transversely extend (as indicated by broken lines) between the bead and flute. The ends of such openings are visible in FIG. 1 and are therefore indicated by solid lines. Slat 10 also has a transversely extending inner groove 18 positioned adjacent to one end of the slat. The preferred material for slat 10 is a suitably rigid and sturdy plastic, such as polyethylene.

Referring to FIG. 2, the outer side of slat 10 is shown as preferably having a recessed central portion 20, which saves on material and minimizes the weight of the slat.

Referring to FIG. 3, this fragmentary top view of collapsible article 22 shows the article as comprising a plurality of preferably identical slats 10 as in their expanded form, with the bead 14 of one slat fitting within the flute 12 of an adjacent slat. As illustrated, the outer side of each slat between the bead and flute is preferably wider than the inner side.

Referring to FIG. 4, this fragmentary and transverse cross section of collapsible article 22 in its expanded form, as viewed along either of the pair of openings 16, illustrates the manner in which an elastic cord 24 is received in and extends through opening 16 of each slat 10. Elastic cord 24 has opposing ends fixedly connected to one of the slats by any suitable means, such as the illustrated staples 26. Elastic cord 24 is preferably under tension, which is easily accomplished during assembly by simply stretching the cord at one end (and cutting off any resulting excess length) before stapling such end to one slat after having stapled the other end to the one slat and threading the cord through an opening of each of the slats. Of course, it is understood that there are a pair of elastic cords 24 corresponding to the pair of openings 16 in each slat 10.

Referring to FIG. 5, this perspective view of the entire collapsible article 22, with its slats 10 in their expanded form, shows such article as being hollow and having opposing open ends so as to define a cylinder. The broken away portion reveals that grooves 18 of slats 10 are aligned with each other and are positioned adjacent to one of the open ends.

Referring to FIG. 6, this top view of collapsible article 22 indicates the substantially circular shape of the cylinder which is defined by the article in its expanded form. It is within the scope of the invention, however, for the expanded form of the article to define other shapes, such as oval, rectangular with rounded corners, etc. FIG. 6 further shows a support member 28 as engaged with slats 10. In the illustrated embodiment, support member 28 is solid insofar as having no breaks or openings therein. The fragmentary and longitudinal cross-sectional view of FIG. 7 illustrates outer edge 30 of support member 28 as securely received in groove 18 of each slat 10. An opening 16 and elastic cord 24 as received therein are also shown in FIG. 7. Support member 28 is easily snapped into the illustrated position by manipulating the ends of the slats adjacent to grooves 18 by hand around the circumference of the article in a gradual manner so as to expand the slats slightly beyond their normally expanded form, thereby allowing outer edge 30 to be received in the groove of each slat.

The collapsible article as shown in FIGS. 6 and 7 is particularly useful as a container, in which support member 28 functions as its bottom. Such a container can be used for plants or any other items, such as trash when used as a wastebasket.

Support member 28 can be removed from slats 10 by manipulating the ends of the slats in the manner discussed above. The plurality of slats 10 can then be collapsed to the substantially flat form of article 22, shown in FIG. 8 as it appears in its relaxed state upon a horizontal supporting surface (not shown). Of course, the article can be made absolutely flat by simply exerting slight pressure upon those slightly bowed areas. This naturally occurs when stacking a number of the collapsed articles upon one another for shipping or storage purposes.

As discussed previously, collapsibility of the inventive article allows minimization of space requirements for storage and/or shipping.

Obviously, many modifications and variations of the present invention are possible in light of the above teachings. For example, the collapsible article having its slats in their expanded form and with at least one support member engaged therewith could be used as a base for another article, such as a tabletop. In this type of application, more than one support member could be employed for additional stability. It is, therefore, to be understood that within the scope of the appended claims, the invention can be practiced otherwise than as specifically described.

That which is claimed is:

1. A collapsible article comprising:

a plurality of slats, each slat having opposing longitudinally extending edges, a flute extending along one edge, a bead extending along the other edge and adapted to fit within the flute of an adjacent slat, and at least one opening transversely extending between the bead and flute; and at least one elongated elastic member received in and extending through said at least one opening of each slat so that the slats are selectively positionable between (i) an expanded, hollow form having opposing open ends, and (ii) a collapsed, substantially flat form.

2. A collapsible article as recited in claim 1 further comprising at least one support member engageable with the slats in their expanded form and removable from the slats to allow collapse thereof.

3. A collapsible article as recited in claim 2 wherein said at least one support member has an outer edge, and wherein at least a portion of the slats each have a transversely extending inner groove such that in their expanded form the grooves of adjacent slats are aligned with each other and adapted to securely but removably receive the edge of said at least one support member therein.

4. A collapsible article as recited in claim 3 wherein said at least one support member comprises a single support member.

5. A collapsible article as recited in claim 4 wherein each of the slats has a groove for receiving the edge of the support member therein.

6. A collapsible article as recited in claim 5 wherein the grooves of the slats are positioned adjacent to one end of such slats as in their expanded form.

7. A collapsible article as recited in claim 6 wherein the support member is solid insofar as having no breaks or openings therein.

8. A collapsible article as recited in claim 1 wherein said at least one opening comprises a pair of openings, and said at least one elongated elastic member comprises a pair of elongated members corresponding to respective openings.

9. A collapsible article as recited in claim 8 wherein each elongated elastic member comprises an elastic cord.

10. A collapsible article as recited in claim 9 wherein each elastic cord has opposing ends fixedly connected to one of the slats.

11. A collapsible article as recited in claim 1 wherein the slats as in their expanded form define a cylinder.

12. A collapsible article as recited in claim 11 wherein the shape of the cylinder is substantially circular.

13. A collapsible article as recited in claim 1 wherein each of the slats is comprised of a plastic material.

* * * * *